April 15, 1930.  E. C. MEYER  1,754,639
COUPLING
Filed June 1, 1927
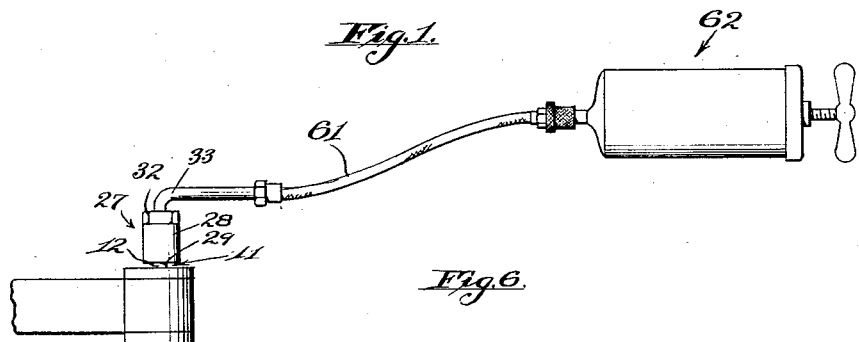
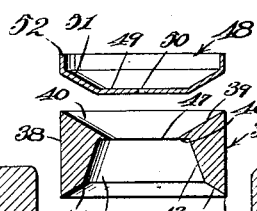
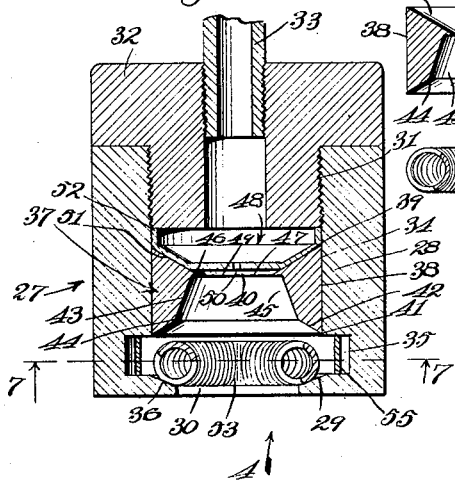
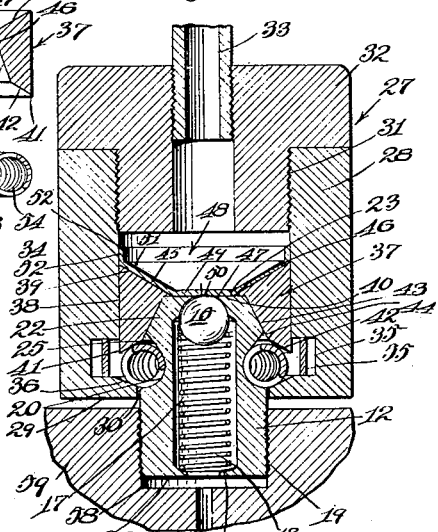
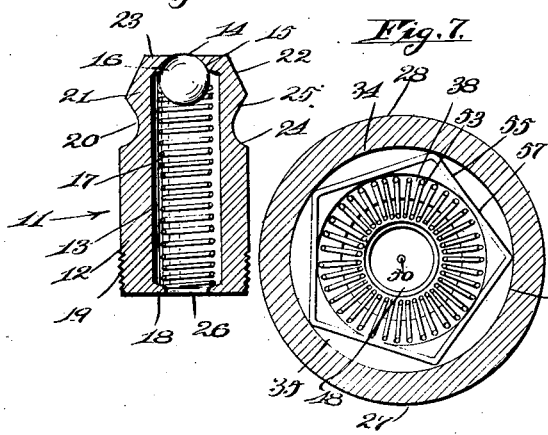
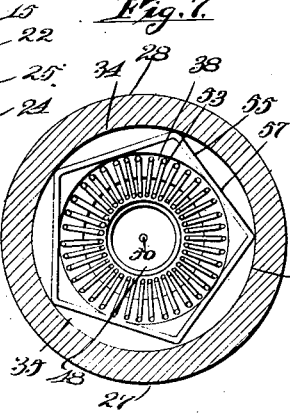
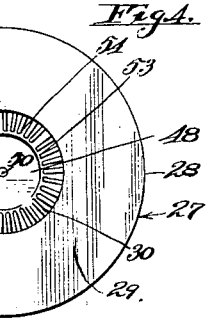
Inventor
E. C. Meyer
by Hazard and Miller
Attorneys Patented Apr. 15, 1930

1,754,639

UNITED STATES PATENT OFFICE

EDWIN C. MEYER, OF LOS ANGELES, CALIFORNIA

COUPLING

Application filed June 1, 1927. Serial No. 195,688.

My invention is a coupling particularly adapted for greasing operative parts of machinery by means of a pressure exerting container which expels the grease to the coupling and through the coupling to the mechanism to be greased.

A more particular object of my invention is the construction of a coupling for use in pressure greasing of motor vehicles or the like in which one element of the coupling is permanently connected to the part to be greased and another element may be connected to a greasing appliance for applying pressure to the grease; and in such coupling an object of my invention is to devise a pair of coupling elements which may be fitted together readily and on increase of the pressure of the grease the coupling is tightened, thereby preventing escape of grease at the coupling.

Another object of my invention is the construction of a coupling with a male element on which a coiled spring may engage, and a female coupling element having a piston therein, this piston having an aperture therethrough to allow passage of grease from a pressure container, and the piston being adapted to compress the spring and force same into contact with the male element of the coupling and also at the same time forming a grease tight joint with such element and the piston.

My invention will be more readily understood from the following description and drawings, in which:

Figure 1 is an elevation of my coupling connected to a pressure container with a high pressure hose extending between the coupling and the container.

Figure 2 is a longitudinal section through the coupling, showing part of the bearing or other element to be greased and part of the connecting tube.

Figure 3 is a section similar to Fig. 2 showing the female element of the coupling.

Figure 4 is a bottom view of the structure of Fig. 3 taken in the direction of the arrow 4.

Figure 5 is a longitudinal section of the male or nipple element of the coupling disconnected from a bearing to be greased.

Figure 6 is a series of longitudinal sectional views showing the piston cup, the piston structure and the wire ring.

Figure 7 is a horizontal section on the line 7—7 of Fig. 2 in the direction of the arrows.

The male or nipple element of the coupling, designated generally by the numeral 11, comprises a hollow cylindrical structure 12, with a central enlarged bore 13 and having a contracted opening 14 at the top with an internal inclined annular valve seat 15. This seat receives the ball valve 16 which is pressed against the seat by the compression spring 17, this spring bearing against a turned in rim 18. The exterior of this cylindrical structure is screw threaded at the end 19, which may be tapered if desired, and has an annular groove or recess 20 with a head 21 above such groove or recess. The head has inwardly tapered walls 22 forming a frustrum of a cone and preferably has a flat end surface 23. The annular groove 20 preferably has a sharper curve at the lower part 24 than the upper part 25.

The grease passes through the nipple from the opening 14 and out the open base 26. The complementary chuck or female element of the coupling, designated generally by the numeral 27, comprises a cylindrical structure 28 which has an annular inwardly turned flange or rim 29, there being a relatively large opening 30 inside this rim or flange. The upper part has internal screw threads 31 to which a coupling nut 32 is threaded, this coupling nut having a grease tube 33 attached thereto. The inside wall 34 is cylindrical. At the lower end of the cylindrical structure 28 there is an internal annular groove 35, this groove being inside of the flange or rim 29, and it is to be noted that this rim has a downward and inward taper as indicated at 36.

The solid part of the piston construction, designated generally by the numeral 37, as shown particularly in Figs. 2, 3 and 6, has a cylindrical outer wall 38, and an upper inwardly and downwardly tapered surface 39 forming a recess 40 on the upper portion. The lower part of the piston preferably has a fairly sharp lower edge 41 inside of which there is an annular upwardly and inwardly tapered lower surface 42 and above this there is another upwardly and inwardly tapered surface 43 of greater taper forming in effect a slight angle 44 on what may be termed the inner wall 45. A slight rim 46 extends inwardly from the surface 43, there being an opening 47 on the axial center of this solid piston construction.

The flexible part of the piston construction comprises a cup device 48. This is preferably formed of leather or the like and has a base 49 with a small opening 50 therethrough. This cup 48 has an inclined portion 51 which conforms to the tapered surface 39 of the recess 40 and has an upwardly extending annular rim 52 which fits against the inside wall 34 of the cylinder 28.

In the assembly below the solid piston structure 37 there is a resilient ring, designated generally by the numeral 53, which is preferably formed of a fairly stiff annular coiled wire, as indicated by the numeral 54. This coil when contracted rests on the inclined surface 36 of the rim 29 and the annular groove 35 is of sufficient height to allow this to be pressed partly into said groove as hereunder described.

A flat or leaf spring 55 is fitted in the annular groove 35, which spring preferably has a comparatively few number of bends, as indicated by the numeral 56, and has substantially flat or straight sections 57 which engage the outer periphery of the coiled spring (Fig. 7).

In equipping the machinery which requires greasing, the nipple or male element 11 is preferably screw threaded into a recess or socket 58 in some part of a solid structure 59 and there is a grease duct 60 leading to the part to be greased. The grease tube 33 may be connected by any suitable flexible or rigid connecting pipe 61 to a pressure exerting device 62 for putting the grease under pressure to feed it through the coupling to the bearing to be greased.

The manner of operation and functioning of my coupling is substantially as follows:

The nipple or male element, as above mentioned, is rigidly secured to the bearing to be greased and the chuck or female element 27 may be readily fitted over the nipple, the head of the nipple passing through the opening 30 and the inclined walls 22 pressing the coiled spring 53 outwardly against the tension of the spring 55 and slightly into the recess 35. When the head portion passes the coiled ring, this slips into the annular groove or recess 20. The structure is then in the assembly ready for applying pressure to the grease.

When the grease is forced under pressure through the tube 33, it exerts a pressure on the flexible cup structure 48, forcing this downwardly and carrying the rigid piston structure 37 with it. The lower annular inclined surface 42 of this rigid piston structure engages the upper outside portion of the resilient ring 53, the annular edge 41 slipping in slightly behind such ring. The ring is thus forced into tight engagement with the annular groove or recess 20 and in such action draws the chuck element into closer engagement with the nipple 11 and the greater the pressure of the grease above the flexible cup the tighter is the fit of the frusto-conical part 22 against the tapered surface 43 of the piston structure, thereby forming a grease tight seal between the nipple and the piston structure and hence the chuck or female element 27 considered as a whole.

Under the pressure exerted on the grease this allows flow of grease through the small opening 50 in the flexible cup structure 48, such grease pressing the ball 16 downwardly against the tension of the compression spring 17 and allowing flow of grease through the contracted opening 14 at the top of the nipple 11. The grease thence flows through the internal central bore 13 of the nipple, through the open base 26, and the grease duct 60, to the part to be greased.

When the pressure is released on the grease pressure device the pressure is taken off the piston structure, allowing it to be forced slightly upwardly either by pressing the chuck element forward on the nipple structure or the chuck or female element 27 may be pulled directly off the nipple element, in which case the spring ring 53 is forced outwardly by the upper inclined portion 25 of the annular groove 20 so that the enlarged part of the head may pass through the inner side of this ring, the ring being forced slightly outwardly into the recess 35 and thus the coupling is detached.

A characteristic feature of my invention is the simplicity of the various elements and their assembly and the readiness with which the chuck or female element may be connected or coupled to the nipple 11. Also that the greater the pressure exerted on the grease, the tighter is the connection and hence the less liable the coupling is to leak under a high pressure than under a low pressure. However, by having a sufficient contact and surface between the upper part of the nipple and the inner inclined wall of the rigid piston structure, the device may be made substantially leak proof under all conditions.

Another characteristic feature of my invention is that the bottom 49 of the flexible part of the piston is forced down by the pressure of the grease pressing against the top 23 of the nipple 11 and hence forming a grease tight joint at this point and allowing the transmission of the grease directly from the small opening 50 through the opening 14 of the nipple. In order to effect this downward bending of the flexible piston, it is desirable to have the upper surface 39 of the solid piston structure forming a somewhat sharp edge at the annular opening 47 at the rim 46. It is also desirable to have the tapered part 22 of the nipple and the inwardly tapered surface 43 of the solid piston structure of such fit that the top surface 23 of the nipple has only a slight clearance from the outside of the rim 46. My construction, therefore, gives a double seal between the chuck element and the nipple in that the flexible part of the piston structure, which may be designated as a flexible washer, forms a seal with the nipple, and the solid piston structure also forms a seal with the nipple.

I have ascertained that when the device is used with ordinary greases, such as used for greasing automobiles or the like, that the spring 55 may be discarded as the ring spring 53 has sufficient resiliency to contract the same.

I have also ascertained that my coupling may be used for many purposes in which a liquid or a semi-liquid may be forced under pressure through a coupling and that it forms an excellent coupling for a hose connection, such as a garden hose, and for large diameter hose, such as a fire hydrant connection, merely necessitating that the parts be made in corresponding sizes for the purpose for which they are intended.

It will, therefore, be seen that I have developed a coupling which may be used generally to couple a plurality of elements for transmitting liquids either of considerable fluidity or those which are more or less plastic without leakage and by a structure allowing a simple and easy operation of attachment and detachment of a coupling.

It will be noted that the coiled ring spring 53 acts as a contractile band which seats of its own resiliency, behind the sloped shoulder formed by the upper part 25 of the groove 20 in the nipple 11. Thus the spring 53 serves to retain the two portions 11 and 27 of the coupling, together, even when no pressure is exerted against the piston structure 37. It is readily apparent then, that when pressure is exerted upon the piston structure as when grease is forced under pressure through the restricted opening 50 in the flexible cup 48, that this pressure upon the piston 37, causes it to move downwards within the cylindrical bore 31, pressing the tapered surface 42 against the outer side of the ring spring 53. Continued pressure upon the piston results in a wedging action by the conical surface 42, to press the ring spring 53 inwards, and thus decrease its effective diameter and pressing it tightly against the bottom of the groove 20 in the nipple. This inward pressure is enhanced by the inwardly inclined surface 36 upon which the ring spring rests, because the downward thrust of the piston upon the ring spring will cause the spring to be wedged inwards by this sloping surface also. Furthermore, in view of the fact that the upper part 25 of the groove 20 is also in the form of the frustrum of a cone, this inward pressure of the ring spring thereupon will result in forcing the nipple 11 further into the female member 27 of the coupling device.

The parts are so proportioned that the area of the upper part of the piston 37 against which pressure may be exerted, is sufficiently greater than the top area of the piston to cause the spring ring 53 to exert a greater upward counter force than the downward force exerted thereagainst by the surface 25, resulting from the same unit pressure upon the top of the nipple as that to which the piston is subjected. Hence, positive provision is made against leakage of grease and possible dislodgment of the female member 27 from the nipple 11, as long as fluid is forced under pressure through the conduit 33 thereto.

It is therefore manifest that my coupling may be made for any practical size of discharge being suitable for ordinary water connections, such as a garden hose, and a fire hose, and in this connection the area of the upper part of the solid movable piston is maintained of a greater area than the upper end of the nipple, the flexible piston having as large an opening as the opening through the nipple.

Various changes may be made in the principles of my invention without departing from the spirit thereof, as set forth in the description, drawings and claims.

I claim:

1. A coupling comprising in combination a tubular nipple having a head and an annular groove below the head of less diameter than the widest part of the head, a chuck having an opening at the bottom, a resilient ring supported at the bottom of the chuck adjacent said opening, said ring being expansible to allow inserting of the head into the chuck and engaging said groove, means in the chuck slidable under pressure of a fluid to engage said resilient ring and part of the head of the nipple to form a fluid tight joint, there being means in the chuck and the nipple for the transmission of a fluid under pressure from the chuck through the nipple.

2. A coupling comprising in combination a nipple having a head with an annular groove below the head, a chuck having an opening at one end, a resilient ring fitted inside said opening, said ring being expansible to allow inserting of the said head and contractable into the said groove, a piston slidable in the chuck, said piston directly engaging the said ring and forcing the ring tightly into the groove, means to shift the piston due to pressure of fluid on the side opposite the nipple, there being passages for fluid through the piston, the piston shifting means and the nipple.

3. A coupling, as claimed in claim 2. the piston and the nipple having contacting rigid surfaces to form a fluid tight joint and the piston having a surface to engage the said ring, the surface of the piston engaging the nipple and that engaging the ring being at an angle one to the other.

4. A coupling comprising in combination a tubular nipple having a head with an annular groove below the head, a chuck having a bore with an opening at the end, a resilient ring positioned in the bore and supported adjacent the open end, a piston slidable in the bore having a lower surface upwardly and inwardly inclined to engage the said ring, having another inner surface to engage part of the head of the nipple to form a fluid tight joint under pressure, and means operative under pressure therebehind for pressing the piston into close engagement with the said ring and part of the head of the nipple, there being passages for fluid through the piston and the nipple.

5. A coupling, as claimed in claim 4, the means operative under pressure comprising a flexible cup like structure having a part to engage the upper part of the piston, and a wall to engage the bore in the chuck, such structure being separate from the piston.

6. A coupling comprising in combination a nipple having a head with an annular groove below the head, the base of said groove being of lesser diameter than the largest diameter of the head, a chuck having a structure with an inner cylindrical bore open at one end, a rim having an upwardly and outwardly inclined surface in the bore, a resilient ring resting on said surface, the said ring being expansible on inserting the head of the nipple and engaging in the said groove, a piston slidable in the bore having a lower surface to engage the ring and to contract said ring into the said groove, the head and the piston having complementary rigid surfaces to interengage and form a fluid tight joint, a flexible piston structure on the upper part of the piston and separate therefrom adapted under pressure of fluid above the piston to force same downwardly into close engagement with the head of the nipple and causing said piston to contract the spring, there being passages for fluid through the flexible piston, the piston and the nipple.

7. A coupling comprising in combination a tubular nipple having a head with an outer surface forming a frustum of a cone, an annular groove below said head, the base of the groove being of less diameter than the widest part of the head, there being a contracted opening in the head, a chuck structure having an element with a cylindrical bore, a rim on said element at the open end of the bore having an upwardly and outwardly inclined surface, a rigid piston slidable in the bore having an upwardly and inwardly inclined surface, a resilient ring fitted in the rim and engageable by the said surface of the piston, the piston having a surface complementary to the frustum of a cone surface of the nipple to engage same to form a fluid tight joint, a flexible piston resting on the rigid piston and engaging the walls of the said bore adapted to move the solid piston on application of a fluid under pressure on the side opposite the nipple, a coupling nut secured to the structure having the cylindrical bore, means to introduce fluid through said nut into the bore above the flexible piston, there being a passage for fluid under pressure through the flexible piston, the piston into the nipple, and through the base of the nipple.

8. A coupling comprising in combination a tubular nipple having a head with a frusto-conical surface, there being an annular groove below said surface, the nipple having an upper surface with an opening therethrough, a chuck having a bore open at one end, with a rim at such end, a resilient ring in said bore resting on the rim, said ring allowing inserting of the nipple and engaging in the said groove, a slidable solid piston having a surface to engage the said ring and force same into tight engagement with the nipple, and having another surface complementary to the frusto-conical surface of the nipple, a flexible structure engaging the piston, said structure making contact with the top surface of the nipple forming a grease tight joint, there being an opening through said structure registering with the opening in the top surface of the nipple.

9. A coupling comprising in combination a chuck structure having a cylindrical bore open at one end, with a rim at such open end, a resilient ring resting on said rim in the bore, a slidable piston having a rigid part with a lower surface to engage the said ring and to force same inwardly, and having an upwardly and inwardly tapered surface, a flexible structure engaging the top of the rigid piston and having a central opening therethrough, there being an opening through the rigid piston, and a nipple insertable in the bore of the chuck and engageable by the said ring and the said piston.

10. A coupling comprising in combination a chuck like structure having a passage therethrough with a piston slidable in said passage, a nipple insertable in the discharge end of the chuck, means in the chuck to engage the nipple, said piston and nipple having co-engaging surfaces and surfaces exposed to pressure of material forced through the chuck and nipple, the area of the piston exposed to said pressure acting in the line of movement of the piston being greater than the area of the nipple exposed to said pressure.

11. In a device of the character described, the combination of a coupling comprising a cylinder, a piston movable therein and having an aperture for discharge of lubricant and having an apertured seat, a nipple engaging said seat and having a passage therethrough, means carried by the cylinder for compressively engaging about the nipple for locking said parts together against longitudinal displacement, said piston and nipple having surfaces exposed to pressure of the lubricant acting in the line of movement of the piston, the area of the said piston surface being greater than the area of the said nipple surface.

12. A coupling comprising in combination a chuck-like structure having a passage therethrough with a rim at its its discharge end, a coiled ring spring mounted on said rim, a nipple having a downwardly tapered exterior surface of lesser diameter at its smaller end than the inside diameter of said ring, a slidable piston having a surface complementary to the tapered surface of said nipple and a second tapered interior surface, the largest diameter of which is greater than the outside diameter of said ring, and means carried by the piston for forcing the said second tapered surface thereof past the ring when activated by pressure behind said means thereby compressing said ring.

In testimony whereof I have signed my name to this specification.

EDWIN C. MEYER.